M. J. GLICK.
CORN HARVESTER.
APPLICATION FILED JUNE 4, 1909.
1,043,313.
Patented Nov. 5, 1912.
3 SHEETS—SHEET 1.
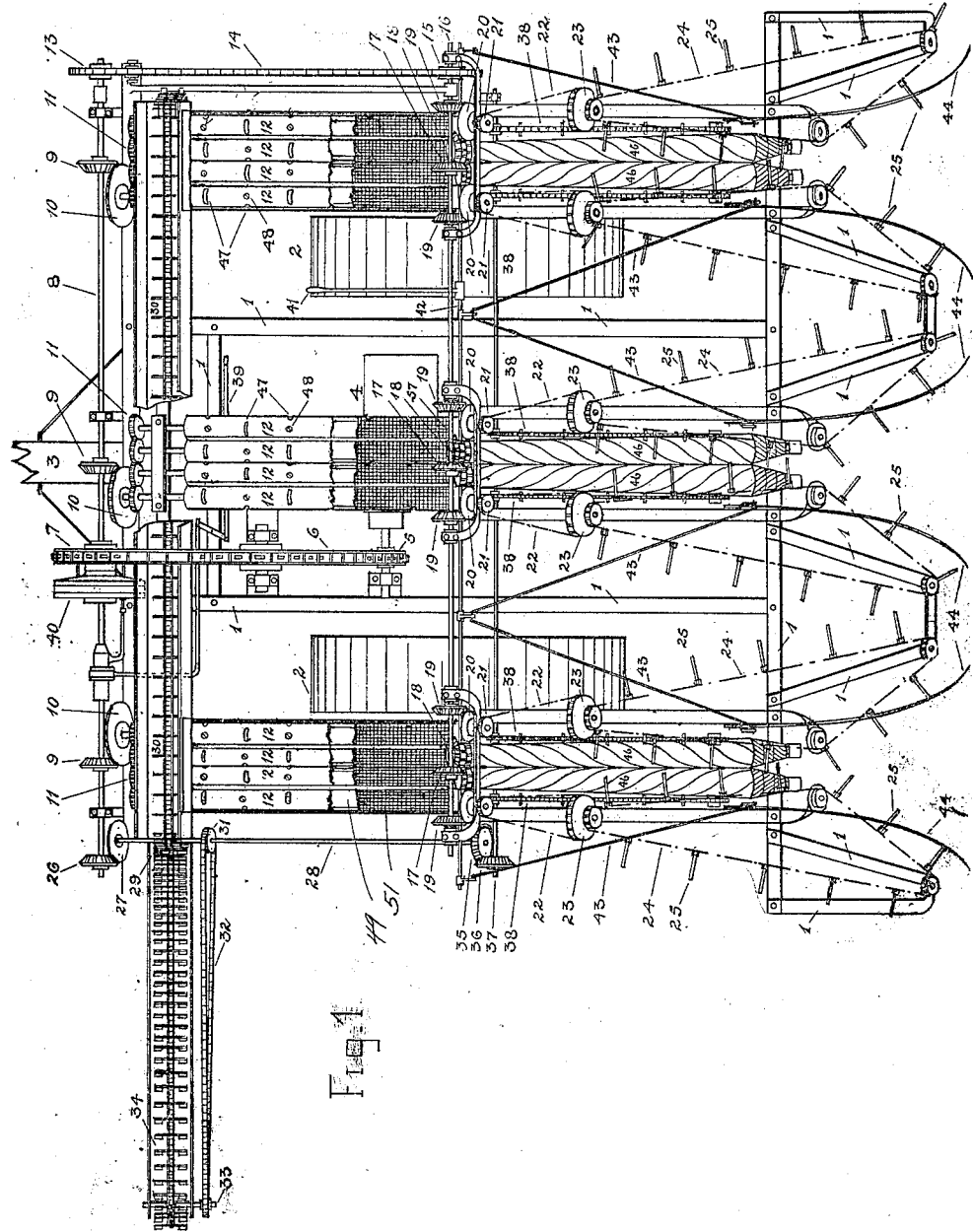
WITNESSES:
INVENTOR
Monroe J. Glick

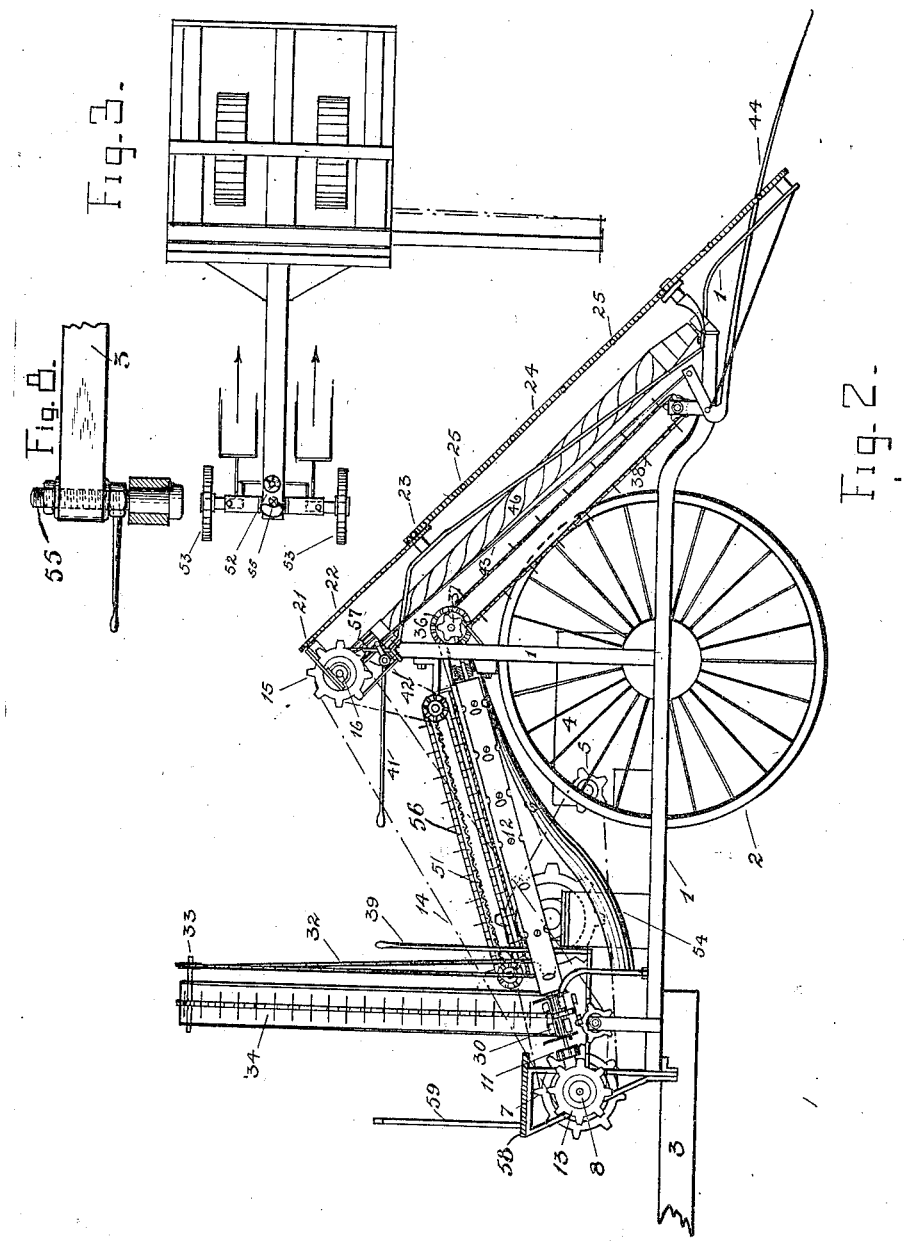

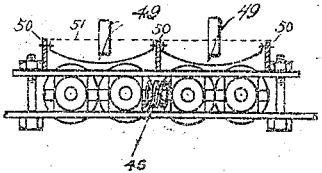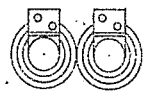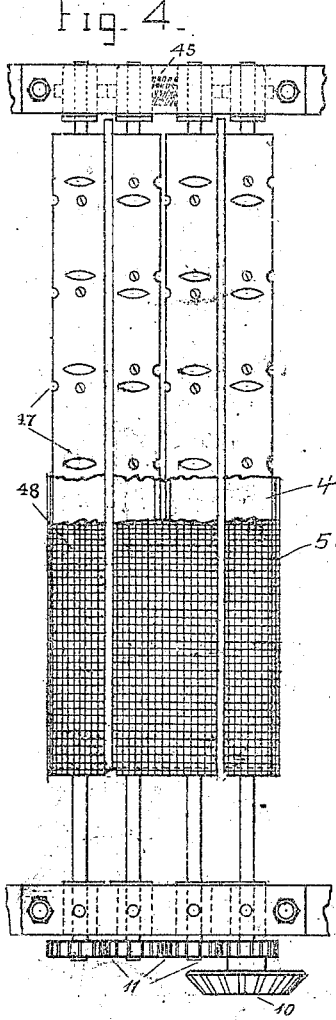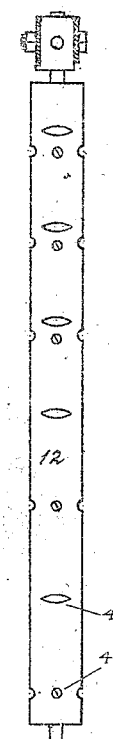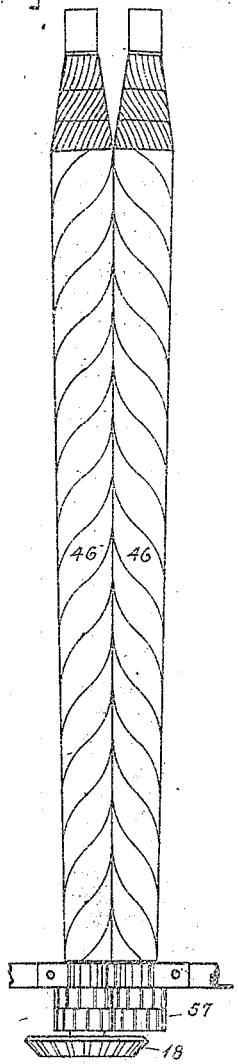

UNITED STATES PATENT OFFICE.

MONROE J. GLICK, OF HUME, ILLINOIS.

CORN-HARVESTER.

1,043,313.   Specification of Letters Patent.   Patented Nov. 5, 1912.

Application filed June 4, 1909. Serial No. 500,204.

*To all whom it may concern:*

Be it known that I, MONROE J. GLICK, a citizen of the United States of America, residing at Hume, R. D. No. 21, in the county of Edgar and State of Illinois, have invented a new and useful Improvement in Corn-Harvesters, of which the following is a specification.

My invention relates to a three row corn husking and harvesting machine, which is propelled by animal power and whose mechanism is worked by motor power, though nothing hinders from applying mechanical power for both. As the machine moves forward, the extended gathering fingers, in connection with the feed chains, provided with fingers, guide the corn stalks to the corrugated nose of the conical spiral grooved cylinders, where the ears of corn are snapped off the stalks. The ears then drop off on either side on a conveyer chain, which conveys and deposits them on the cylindrical, notched and toothed rollers in the rear part of the machine where they are husked. They then drop on a suitable conveyer and elevator arrangement which delivers them to the accompanying farm wagons. I attain these objects by the mechanism illustrated in the accompanying drawings, in which—

Figure 1 is the top plan; Fig. 2, a side view; Fig. 3, a general outline of the machine showing the mode of hitching the animals, the position of the guide wheels at the end of the tongue, and the steering arrangement. Figs. 4, 5, and 6, show the cylindrical, notched and toothed husking rollers; Fig. 7 shows the conical and spiral grooved snapping rollers. Fig. 8 is a detail view of the turn screw lever between the tongue and the axle of the guide wheels.

Similar numerals refer to similar parts throughout the several views.

The machine is mounted on an iron frame 1 built up of channels and angle iron, which rests by bearings on the main axle of the freely revoluble traction wheels 2. To propel the machine the horses are hitched to the end of the tongue facing it, and the driver by proper manipulation of the steering wheel 52 directly in front of his seat, and connected pivotally by levers to the axle of the guide wheels 53, as shown in Fig. 3, steers it. The power to run the various mechanism of the machine, is derived from the motor 4, (Fig. 1) and is transmitted by a sprocket wheel 5 mounted on its main shaft, the link chain 6, and the sprocket wheel 7, fixed with the friction wheel 40 to the primary shaft 8, which in turn transmits it by the gear wheels 9 to the gear wheels 10 mounted on the axle of one of the cylindrical, notched and toothed rollers 12, in each of the three sets; and then by a smaller cog wheel 11 on the same axle, to the other rollers similarly provided. Each of these three sets of rollers consists of two pairs side by side, the rollers of each pair revolving in opposite directions. They are provided with wooden sideboards 50 (Fig. 5) and covered with a wire netting 51 for protection. These cylindrical, notched and toothed rollers are fixed at their lower ends, but at their upper ends permit of a lateral movement to prevent choking, and each pair of rollers is held in normal position by a spiral spring 45 between them (Figs. 4 and 5.) An endless rake chain 56 revolving on rods parallel with the primary shaft 8 and secondary shaft 16 and driven from the latter, is used (Fig. 2), running lengthwise over each pair of husking rollers to facilitate the movement of the ears of corn toward the elevator and prevent clogging.

In case it is desired not to husk the ears of corn, a removable concave plate of metal 49 shown in Fig. 5, is inserted over the rollers 12, and the ears move over this plate instead of over the husking rollers 12, to the conveyer 30 and the elevator 34. The primary shaft 8 further transmits power by the sprocket wheel 13 and link chain 14 to the sprocket wheel 15 mounted on the secondary shaft 16, which in turn transmits it by the gear wheels 17 to the gear wheels 18, the latter mounted on the axle of one of the spiral grooved and conical rollers 46, of each of the three sets; these axles being provided with stepped spur wheels 57, revolve the adjoining roller similarly provided. The secondary shaft 16 also transmits power through the gear wheels 19 to the gear wheels 20 and the sprocket wheels 21 mounted on the same shaft, thence by the link chains 22, to the double sprocket wheels 23 which rotate the link chains 24 provided with fingers 25. The primary shaft 8 also transmits power by the gear wheel 26 to a gear wheel 27 and a sprocket wheel 29 both mounted on the shaft 28. The sprocket wheel 29 operates the link conveyer chain 30. It also transmits power through a sprocket wheel 31 mounted on the shaft 28, and link chain 32 to the axle 33, provided with a sprocket wheel which rotates the elevator link chain 34. The shaft 28 also transmits power by the gear wheels 35 and 36 to the shaft 37 which drives the conveyer chains 38.

By proper manipulation of the lever 39 pivotally connected with a friction wheel 40, the mechanism is thrown in and out of gear. Also by proper manipulation of the lever 41 connected to shaft 42 and rods 43 pivotally connected to the gathering fingers 44, the latter can be raised or lowered as required. Both of these manipulations being readily performed by the operator running the machinery, whose seat behind lever 41, is so disposed that he can reach either 41 or 39. The primary shaft 8 with its mechanical appurtenances is covered by a running or foot board 58 provided with a hand railing 59 for ready and safe access to any part of its mechanism. A suitable bent plate 54 is provided under each outside set of the husking rollers 12, to deposit the husks outside the machine. A turn screw lever 55 (Fig. 8) between the tongue 3 and the axle of the guide wheels 53 permits of adjustment of the height of either end of the machine as desired. The snapping rollers 46 are conical in shape and spirally grooved. They are provided with a conical nose made in three pieces also spirally grooved but of finer corrugations than that of the main body of the roller. The husking rollers are notched and toothed in four rows, and cylindrical in shape. These notches and teeth are placed opposite each other, in the adjoining rollers, so as to permit of the passage of the teeth through the notches when they revolve.

The spacing of the notches and teeth increases gradually from the upper to the lower end of the rollers, and the face of the teeth to be that of a screw head having a cutting edge.

From the foregoing description and the accompanying drawings, the construction and operation of the invention will be readily understood.

Various changes in form, proportions and minor details of construction may be resorted to without departing from the principle or sacrificing any of the advantages of the invention, as defined in the appended claims.

Having thus described my invention, I claim:

1. In a corn harvester, the combination with the basal frame, of vertical supports rising from the middle thereof, inclined snapping rollers having their front end journaled in the frame and their rear end retained in elevated position by the supports, guide fingers having a bell crank portion pivoted to the frame and guiding the stalks between the rollers, a rock shaft journaled in the supports, means for rocking the same, and connections between said shaft and the bell crank portion of the fingers for vertically adjusting the latter.

2. In a corn harvester, the combination with a frame, of supporting wheels therefor, supports rising from the middle of the frame, an upper cross-piece connecting said supports, snapping rollers having one end journaled in the front of the frame and inclining upwardly and rearwardly and having the other end supported by said cross-piece, guide fingers having a bell crank portion pivotally secured to the front of the frame, a shaft having rock arms journaled in the supports, means for rocking the shaft and arms, connections between the arms and fingers for adjusting the latter, an endless chain provided with fingers and moving transversely to supplement the guide-fingers in guiding the stalks against the snapping rollers, a rearwardly operating endless carrier located on each side of said rollers and having one end supported by the supports, said carrier receiving and conveying the ears removed by the rollers, and husking rollers mounted on the rear of the frame and receiving the ears from said carriers.

3. In a corn harvester, the combination with a frame, of supporting wheels therefor, supports rising from the middle of the frame, an upper cross-piece connecting said supports, snapping rollers having one end journaled in the front of the frame and inclining upwardly and rearwardly and having the other end supported by said cross-piece, guide members having a bell crank portion pivotally secured to the front of the frame adjacent the rollers, a rock shaft journaled in the supports and provided with a plurality of rock arms, means for rocking the shaft, connections between the arms and the bell crank portions of the guide members for vertically adjusting the same on their pivots, a transversely moving endless belt for engaging the stalks and supplementing the action of the fingers in bringing the stalks between the rollers, an endless carrier on each side of the said rollers, one end of said carrier being supported by the frame and the other by brackets formed on the supports, a second cross-piece connecting the supports, brackets secured to the rear of the frame, husking rollers having one end supported by the brackets and the other by the second cross-piece, the upper end of said husking rollers being just below the termination of the endless carriers and there being a pair of rollers for each carrier, the ears snapped off by the snapping rollers dropping onto the said carriers and being delivered by them to the husking rollers, an endless carrier for taking away the ears located at the lower end of the husking rollers, and means for operating the various parts in unison.

4. In a corn harvester, the combination with a frame, of vertical supports rising therefrom, cross-pieces connecting said supports, inclined snapping rollers having their lower ends journaled in the frame and their upper ends journaled in the upper cross-piece, guide fingers pivoted to the forward portion of the frame, a rock shaft journaled in the supports, means for rocking same, connections between said shaft and the guide fingers for vertically adjusting the latter, chains for supplementing the action of the guide fingers, means for conveying the ears removed by the snapping rollers toward the rear of the harvester, husking rollers arranged rearwardly of and in angular relation with the snapping rollers, a rake chain arranged adjacent to and facilitating the action of the husking rollers, an endless carrier arranged at the lower end of the husking rollers for removing the ears, and means for operating the various parts in unison.

5. In a corn harvester, the combination with a frame, of inclined snapping rollers carried thereby, an endless belt for bringing the stalks between the rollers, an endless carrier arranged on each side of the rollers, husking rollers arranged rearwardly of the snapping rollers, a driving element mounted on the frame, a primary shaft arranged rearwardly thereof and operatively connected therewith, means carried by said shaft for rotating the husking rollers, a secondary shaft arranged parallel to the primary shaft, means mounted upon said secondary shaft for rotating the snapping rollers, a chain connecting the primary and secondary shafts, a countershaft parallel to the secondary shaft, an inclined shaft connecting the primary and countershafts, and means carried by the countershaft for operating the endless carrier on each side of the snapping rollers.

6. In a corn harvester, the combination with a frame, of inclined snapping rollers carried thereby, an endless fingered chain for bringing the stalks between the rollers, an endless carrier arranged on each side of the rollers, husking rollers arranged rearwardly of the snapping rollers, a driving element mounted on the frame, a primary shaft arranged rearwardly thereof and operatively connected therewith, means carried by said shaft for rotating the husking rollers, a secondary shaft arranged parallel to the primary shaft, means mounted upon said secondary shaft for rotating the snapping rollers, means carried by the secondary shaft for operating the endless fingered chain of the snapping rollers, a chain countershaft parallel to the secondary shaft, an inclined shaft connecting the primary and countershafts, and means carried by the countershaft for rotating the endless carriers of the snapping rollers.

7. In a corn harvester, the combination with a frame, of snapping rollers carried thereby, an endless fingered chain for bringing the stalks between the rollers, an endless carrier arranged on each side of the rollers, husking rollers arranged rearwardly of the snapping rollers, a driving element mounted on the frame, a primary shaft arranged rearwardly thereof and operatively connected therewith, means carried by said shaft for rotating the husking rollers, a secondary shaft arranged parallel to the primary shaft, means mounted upon said secondary shaft for rotating the snapping rollers, means carried by the secondary shaft for operating the endless fingered chain of the snapping rollers, a chain connecting the primary and secondary shaft, an inclined shaft arranged at one side of the frame and operatively connected with the primary shaft, a transverse shaft arranged parallel to the secondary shaft and operatively connected with the inclined shaft, means carried by the transverse shaft for rotating the endless carriers of the snapping rollers, and a control device mounted upon the frame and operatively connected with the primary shaft whereby the driving mechanism may be thrown into and out of operation.

8. In a corn harvester, the combination with a frame, of snapping rollers carried thereby, an endless fingered chain for bringing the stalks between the rollers, an endless carrier arranged on each side of the rollers, husking rollers arranged rearwardly of the snapping rollers, an endless rake chain acting in conjunction with the husking rollers, a conveyer arranged at the lower end of said rollers and at right angles thereto, an elevator device arranged adjacent said conveyer, a motor mounted on the frame, a primary shaft connected with the driving means, means carried thereby for operating the husking rollers, a secondary shaft arranged parallel to the primary shaft, a chain connecting said shafts at one end, means carried by the secondary shaft for operating the endless fingered chain associated with the snapping rollers, and means carried by said secondary shaft for operating the snapping rollers, an inclined shaft arranged at one side of the frame, and connections between said inclined shaft and the elevator and lower transverse conveyer for operating said parts.

9. In a corn harvester, the combination with a frame, of snapping rollers carried thereby, an endless fingered chain for bringing the stalks between the rollers, an endless carrier arranged on each side of the rollers, husking rollers arranged rearwardly of the snapping rollers, an endless rake chain acting in conjunction with the husking rollers, a conveyer arranged at the lower end of said rollers and at right angles thereto, an elevator device arranged adjacent said conveyer, a motor mounted on the frame, a primary shaft connected with the motor, means carried thereby for operating the husking rollers, a secondary shaft arranged parallel to the primary shaft, a chain connecting said shafts at one end, means carried by the secondary shaft for operating the endless fingered chain associated with the snapping rollers, means carried by said secondary shaft for operating the snapping rollers, an inclined shaft arranged at one side of the frame, connections between said inclined shaft and the elevator and lower transverse conveyer for operating said parts, a shaft arranged parallel and adjacent to the secondary shaft and operatively connected with the inclined shaft, and connections between said parallel shaft and the endless carrier for the snapping rollers for operating said endless carriers.

10. In a corn harvester, the combination with a frame, of vertical supports rising therefrom, cross-pieces connecting said supports, sets of inclined snapping rollers carried by said frame and the upper of said cross-pieces, sets of husking rollers arranged rearwardly of the snapping rollers, driving means for said snapping and husking rollers, and means including concaved plates supported above the husking rollers and operating in conjunction with the snapping rollers whereby the operator may gather the corn unhusked when desired.

11. In a corn harvester, the combination with a frame, of vertical supports rising therefrom, cross-pieces connecting said supports, sets of inclined snapping rollers carried by said frame and the upper of said cross-pieces, sets of husking rollers arranged rearwardly of the snapping rollers, driving means for said snapping and husking rollers, sideboards secured to one of the cross-pieces and to the frame and arranged above the husking rollers, concaved plates carried by said sideboards and operating in conjunction with the snapping rollers for preventing husking of the corn when desired, a rake chain arranged above and operating in conjunction with the husking rollers, and a screen arranged above the husking rollers and secured to the sideboards.

12. In a corn harvester, the combination with a frame, of vertical supports rising therefrom, cross-pieces connecting said supports, sets of inclined snapping rollers carried by said frame and the upper of said cross-pieces, sets of husking rollers arranged rearwardly of the snapping rollers, driving means for said snapping and husking rollers, sideboards secured to one of the cross-pieces and to the frame above the husking rollers, one sideboard being arranged on the outside of each set of husking rollers and one between the pairs in each set, concaved plates carried by said sideboards and operating in conjunction with the snapping rollers for preventing husking of the corn when desired, a rake chain arranged above and operating in conjunction with the husking rollers, and a screen arranged above the husking rollers and secured to the sideboards.

In testimony whereof I affix my signature in the presence of two witnesses at Paris, Illinois, this 1st day of June, 1909.

MONROE J. GLICK.

Witnesses:
 Don A. Jones,
 A. Y. Trogdon.